(No Model.) 2 Sheets—Sheet 2.

J. SHANKS, Jr.
LAWN MOWER.

No. 537,620. Patented Apr. 16, 1895.

Witnesses
Reeve Lewis
W. Rees Edelen

Inventor.
James Shanks Jr. by
Pollok & Mauro
his attorneys.

UNITED STATES PATENT OFFICE.

JAMES SHANKS, JR., OF ARBROATH, SCOTLAND.

LAWN-MOWER.

SPECIFICATION forming part of Letters Patent No. 537,620, dated April 16, 1895.

Application filed January 22, 1895. Serial No. 535,796. (No model.)

*To all whom it may concern:*

Be it known that I, JAMES SHANKS, Jr., B. Sc., engineer, a subject of the Queen of Great Britain and Ireland, residing at Arbroath, Scotland, have invented certain Improvements in Lawn-Mowers, of which the following is a specification.

This invention consists in the combination with the main or driving axles of lawn mowers of springs which may be of any suitable material such as india rubber or steel or other metal and which may be of spiral or other shape.

The accompanying drawings illustrate what I consider the best means of carrying my invention into practical effect.

Figure 1:
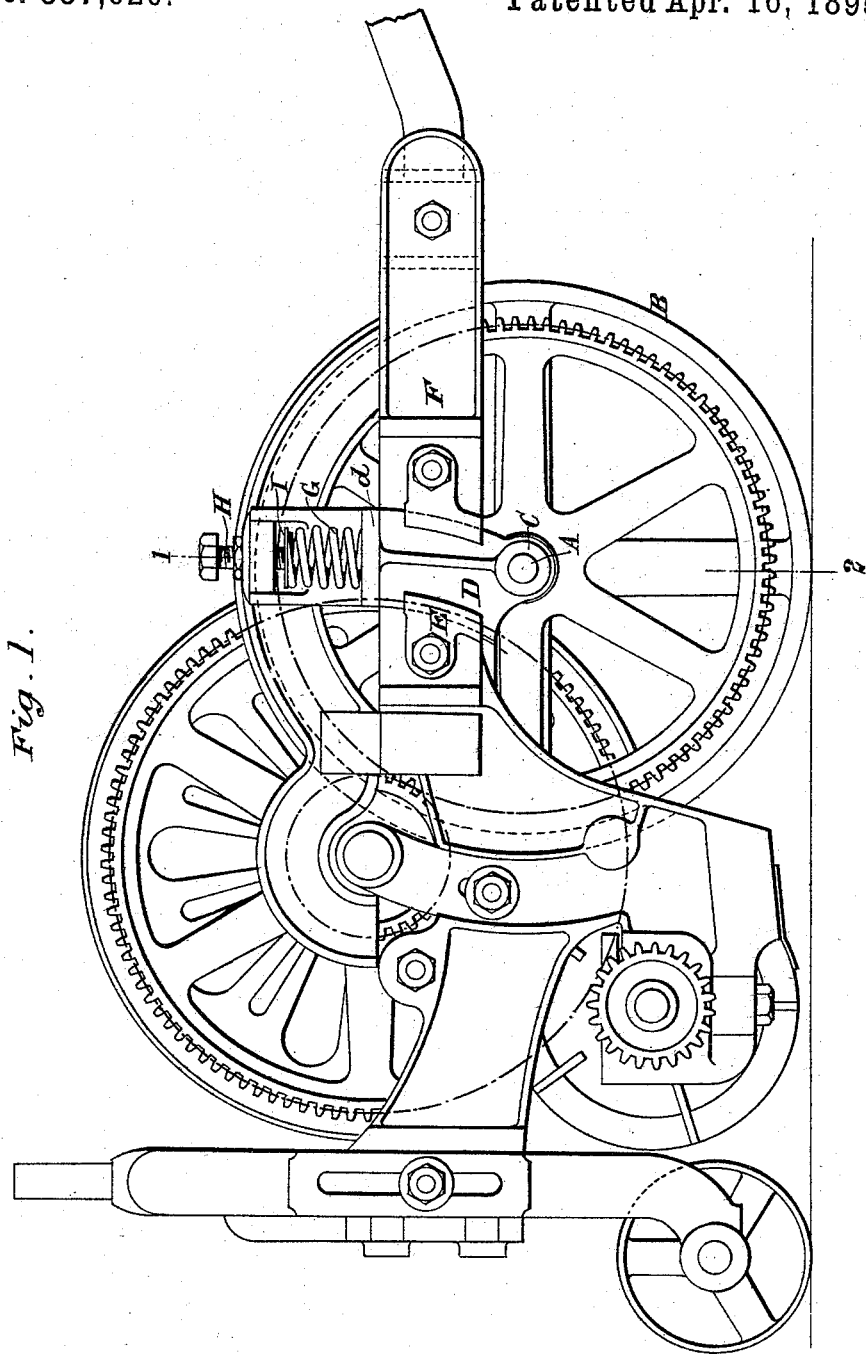
Figure 2:
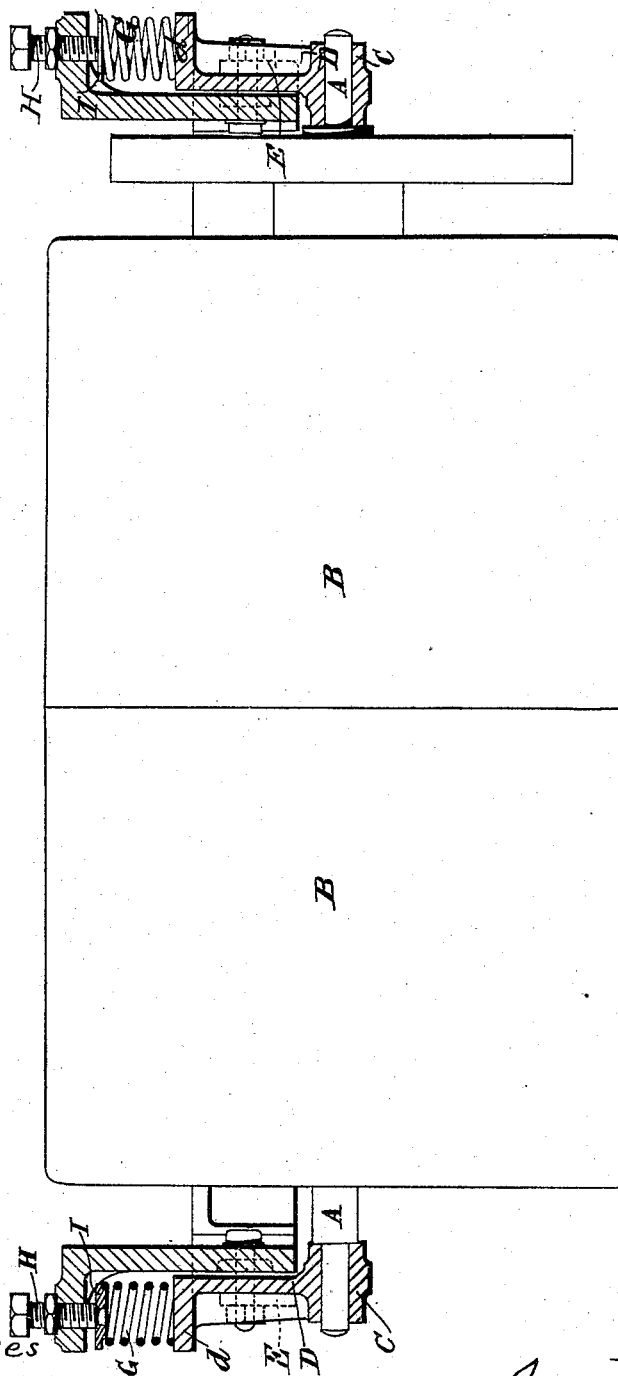

Figure 1 is a side elevation of a lawn mower provided with springs according to my invention; and Fig. 2 is a transverse section on the line 1, 2, Fig. 1.

The axis A of the main roller or rollers B is mounted in bearings C in brackets D capable of sliding in guides E carried by the framing F and the springs G bear against projections from or connected with the said brackets and against projections or extensions on arms F' connected with the framing the pressure of the springs being, if desired, adjustable by means of screws which adjust bearing pieces upon which the springs G bear instead of bearing directly upon either of the aforesaid projections. An arrangement on this latter plan is that which I have illustrated in the drawings the adjusting screws being marked H they passing through projections from the framing F and being shouldered to bear on bearing pieces I against which one of the ends of the springs bear the other of the ends of the said springs bearing against the projections *d* from the brackets D. The screws after being adjusted are locked by the lock nuts thereon.

I do not limit myself to the precise arrangement shown as the springs may be arranged in any suitable way between the axles and the framing or an attachment thereto.

On the occurrence of an upward jirk or lift of the rollers, caused by roughness of the ground or other cause, the brackets D rise in the guides E and compress the springs G instead of the strain being communicated directly to the framing of the machine and to the operator and shocks and strains to both the machine and the operator are greatly reduced.

The invention is applicable to lawn mowers generally whether operated by hand or horse or pony or other means.

Having now particularly described and ascertained the nature of my said invention and in what manner the same is to be performed, I declare that what I claim is—

In a lawn mower the combination with the main or driving axle and the framing, of brackets in which said axle is mounted, guides on the framing in which said brackets slide, arms on the framing overhanging the brackets, coiled springs interposed between the overhanging arms and brackets, and adjusting bolts in the arms for regulating the tension of the springs, substantially as described.

In testimony whereof I have signed my name to this specification in the presence of two subscribing witnesses.

JAMES SHANKS, JR.

Witnesses:
 ALEXANDER JOHNSTON,
 DAVID HUNTER.